United States Patent
Yagi et al.

(10) Patent No.: US 7,245,487 B2
(45) Date of Patent: Jul. 17, 2007

(54) COOLING SYSTEM, ELECTRONIC EQUIPMENT, AND EXTERNAL UNIT

(75) Inventors: Hironori Yagi, Tokyo (JP); Yasuhiro Ootori, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 302 days.

(21) Appl. No.: 10/991,163

(22) Filed: Nov. 16, 2004

(65) Prior Publication Data

US 2005/0145404 A1 Jul. 7, 2005

Related U.S. Application Data

(63) Continuation of application No. PCT/JP03/02062, filed on Feb. 25, 2003.

(51) Int. Cl.
*H05K 7/20* (2006.01)
(52) U.S. Cl. .................. 361/695; 361/686; 361/687; 165/104.33; 165/104.34; 454/184
(58) Field of Classification Search .............. 361/686, 361/687, 690–695, 704–712, 697, 725; 165/58, 165/185, 104.32, 104.33, 104.34; 174/15.1, 174/52.4, 15.2, 252; 454/184; 395/281, 395/283, 750.08, 750.01, 750.06
See application file for complete search history.

(56) References Cited

U.S. PATENT DOCUMENTS 6,239,970 B1  5/2001  Nakai et al.

FOREIGN PATENT DOCUMENTS

| JP | 6-268388 | 9/1994 |
| JP | 2545616 | 5/1997 |
| JP | 9-266391 | 10/1997 |
| JP | 411039063 A * | 2/1999 |

OTHER PUBLICATIONS

International Preliminary Examination Report dated Sep. 19, 2003.
International Search Report dated Apr. 8, 2003.

* cited by examiner

*Primary Examiner*—Michael Datskovskiy
(74) *Attorney, Agent, or Firm*—Katten Muchin Rosenman LLP

(57) ABSTRACT

Electronic equipment (3) has an electronic equipment main body (1) and an external device (2) attached to this electronic equipment main body (1). A first side face (21B) of a housing (21) for the external device (2) adjoins an exhaust port (112) of the electronic equipment main body (1). A first opening (211B) is formed on this first side face (21B). A second opening (211D) is formed on a third side face (21D) facing the first side face (21B). Because of the rotation of an exhaust fan (113) and the air exhausted from the exhaust port (112), negative pressure is generated near the first opening (211B), and air flows from the second opening (211D) to the first opening (211B).

16 Claims, 6 Drawing Sheets

RESULT OF TEMPERATURE MEASUREMENT (°C)

| | WIDTH OF OPENING (mm) | | | |
|---|---|---|---|---|
| | 0 | 3 | 10 | 20 |
| HEATER | 105.59 | | 97.52 | 96.46 |
| IC | 57.84 | 51.37 | 37.51 | 36.92 |
| HOUSING (LEFT) | 45.59 | 41.87 | 38.67 | 37.66 |
| HOUSING (MIDDLE) | 44.33 | 42.19 | 40.19 | 39.90 |
| HOUSING (RIGHT) | 33.52 | 32.61 | 31.62 | 31.45 |
| NEAR THE SECOND OPENING | 26.15 | 24.93 | 24.47 | 24.21 |
| NEAR THE FIRST OPENING | 26.11 | 27.42 | 32.11 | 29.46 |

| TEMPERATURE DROP(°C) | | | | |
|---|---|---|---|---|
| | WIDTH OF OPENING (mm) | | | |
| | 0 | 3 | 10 | 20 |
| HEATER | 0.00 | | 8.07 | 9.12 |
| IC | 0.00 | 6.47 | 20.33 | 20.92 |
| HOUSING (LEFT) | 0.00 | 3.72 | 6.92 | 7.93 |
| HOUSING (MIDDLE) | 0.00 | 2.14 | 4.15 | 4.43 |
| HOUSING (RIGHT) | 0.00 | 0.91 | 1.91 | 2.07 |
| NEAR THE SECOND OPENING | 0.00 | 1.22 | 1.68 | 1.94 |
| NEAR THE FIRST OPENING | 0.00 | -1.31 | -5.99 | -3.35 |

COOLING SYSTEM, ELECTRONIC EQUIPMENT, AND EXTERNAL UNIT

CROSS REFERENCE TO RELATED APPLICATION

The pressent application is a continuation of International Application No. PCT/JP03/02062 which was filed on Feb. 25, 2003, which is herein incorporated by reference.

TECHNICAL FIELD

The present invention relates to a cooling system, electronic equipment, and an external unit.

BACKGROUND ART

Conventionally, electronic equipment such as a personal computer and an entertainment device may include a main unit (a main body of the electronic equipment) and an external unit connected and placed adjacent to the main unit such as, for instance, external equipment for enhancing functions of the main body of the electronic equipment.

In recent years, the external unit described above tends to be smaller in size and higher in density, and heat generated inside the external unit is hardly discharged to the outside. To cool the heat, it is conceivable to apply a cooling mechanism such as a fan or a heat sink to the external unit, but when these types of mechanisms are applied, further size reduction of the external unit becomes difficult.

An object of the present invention is to provide a cooling system for cooling an external unit connected and placed adjacent to a main unit, especially a cooling system enabling cooling without impeding size reduction of the external unit, and also to provide an external unit and electronic equipment used for the cooling system as described above.

DISCLOSURE OF THE INVENTION

According to an aspect of the present invention, in a cooling system for cooling an external unit connected and placed adjacent to a main body unit having an exhausting air inside, the external unit has a heating element and a housing for accommodating the heating element therein, and at least one opening communicated with inside of the housing is formed on a first face adjoining the exhaust port of the housing of the external unit.

The external unit is located so that it adjoins the exhaust port of the main body unit, and an opening is formed on the first face adjoining the exhaust port. The air near the exhaust port of the main body unit, namely the air near the opening of the housing of the external unit flows together with the air exhausted from the exhaust port, so that negative pressure is generated at the opening of the housing of the external unit. Therefore, the air flows from inside of the housing of the external unit toward the opening, and with this air, the heating element accommodated within the housing of the external unit can be cooled. As described above, the cooling system according to the present invention utilizes the negative pressure generated in association with exhaustion of air from the exhaust port of the main body unit, so that it is required only to provide an opening on a housing of the external unit, and therefore size reduction of the external unit is not impeded.

In the present invention, preferably the main body unit includes an air exhaust fan for forcibly exhausting air inside the main body unit from the exhaust port.

When the main body unit has an exhaust fan, negative pressure is generated near the exhaust port (near the opening of the housing of the external unit) in association with rotation of the exhaust fan. The negative pressure generated in association with rotation of the exhaust fan is added to the negative pressure generated due to exhaustion of air from the exhaust port, so that larger negative pressure is generated and air inside the housing of the external unit can be exhausted from the opening securely, and therefore the heating element inside the housing of the external unit can be cooled securely.

In this configuration, the opening is preferably provided at a position where a swirl of air generated in association with rotation of the exhaust fan goes away from the opening.

In the present invention, the exhaust port is formed at a position where the swirl of air generated in association with rotation of the exhaust fan goes away therefrom, so that the negative pressure generated in association with rotation of the exhaust fan can be utilized efficiently.

In the present invention, preferably the external unit is attached to the main body unit.

By attaching the external unit to the main body unit, the face of the housing of the external unit on which an opening is formed can closely be adjoined to the exhaust port of the main body unit. With this configuration, the air inside the external unit can be exhausted securely.

In the present invention, preferably at least one second opening for sucking air is provided on the housing of the external unit at a position away from the opening.

The expression of "position away from the opening" as described herein indicates a position little affected by exhaustion of air from the exhaust port of the main body unit, namely a position where negative pressure is little generated even when air is exhausted from the exhaust port.

Negative pressure due to exhaustion of air from the exhaust port is generated near the opening formed on the first face adjoining the exhaust port. When a second opening is formed at a position away from the opening, a difference in air pressure is generated between the air pressure near the second opening and that near the opening. Because of this difference in air pressure, air flows from the second opening to the opening, and therefore, inside of the housing of the external unit can be cooled securely.

In the present invention, preferably the housing has a second face opposing the first face on which the opening is formed, and the second opening should preferably be formed on the second face.

By forming the second opening on the second face opposing the first face on which the opening is formed, it becomes possible to let air through all portions inside the housing, and inside of the housing can be cooled more securely.

In this step, the opening and the second opening should preferably be positioned to be substantially symmetric about the center of the external unit.

As the opening and the second opening are positioned to be substantially symmetric about the center of the external unit, air flows through a central portion of the external unit, so that cooling is performed efficiently.

The width of the opening should preferably be 10 mm or more.

In the present invention, as the width of the opening is 10 mm or more, the external unit can be cooled efficiently.

In this configuration, the main body unit is a main body of electronic equipment, and preferably the external unit is an external device connected to the main body of the electronic equipment for enhancing functions of the main body of the electronic equipment.

The external devices include, for instance, an external storage device for enhancing the storage functions of the electronic equipment. Most of such external devices are affected by heat relatively easily, and size reduction of the external devices is required, so that application of the cooling system according to the present invention is preferable.

According to another aspect of the present invention, an electronic equipment includes a main body of the electronic equipment and an external device connected to the main body of the electronic equipment for enhancing functions of the main body of the electronic equipment, and it is characterized in that the main body of this electronic equipment includes an exhaust port for exhausting air inside the main body of the electronic equipment; the external device has a main body section for enhancing functions thereof and a housing of accommodating the main body section therein; the main body section has a heating element; the external device is attached to the main body of the electronic equipment at a position adjacent to the exhaust port; and at least one opening communicated with inside of the housing is formed on a face of the external device adjoining the exhaust port.

The external device is attached to the main body of the electronic equipment so that the housing adjoins the exhaust port of the main body of the electronic equipment, and an opening is formed on the face adjoining the exhaust port. The air near the opening of the housing of the external device flows together with the air exhausted from the exhaust port of the main body of the electronic equipment, and negative pressure is generated near the opening of the housing of the external device. Therefore, air flows from inside of the housing of the external device toward the opening, and with this air, inside of the external device can be cooled. Further, as inside of the housing can be cooled only by forming an opening on the housing of the external device, size reduction of the external device is not impeded.

In this configuration, preferably at least one second opening for sucking air is formed at a position away from the aforementioned opening.

Negative pressure is generated at the aforementioned opening in association with exhaustion of air from the exhaust port. Therefore, a difference is generated between the air pressure near the aforementioned opening and that near the second opening, and air flows from the second opening toward the aforementioned opening. Thus, the heating element inside the housing of the external device can be cooled.

Preferably, the main body of the electronic equipment has an exhaust fan for forcibly exhausting air used for cooling the inside from the exhaust port, and also preferably the aforementioned opening is formed at a position where a swirl of air generated in association with rotation of the exhaust fan flows away from the aforementioned opening.

When the main body of the electronic equipment has an exhaust fan, negative pressure is generated near the exhaust port (near the opening of the housing of the external device) in association with rotation of the exhaust fan. Because the negative pressure generated in association with the exhaust fan is added to the negative pressure generated in association with exhaustion of air from the exhaust port, larger negative pressure is generated, so that air inside the housing of the external device can be exhausted from the opening securely, whereby inside of the housing of the external device can be cooled.

Further, as the opening is formed at a position where a swirl of air generated in association with rotation of the exhaust fan flows away from the opening, the negative pressure generated in association with rotation of the exhaust fan can be utilized efficiently.

An external unit according to still another aspect of the present invention is an external unit provided adjacent to a main body unit having an exhaust port for exhausting air from the inside thereof, and includes a heating element and a housing of accommodating the heating element therein, and the external unit is characterized in that at least one opening communicating with inside of the housing is formed on a first face adjoining the exhaust port on the housing.

In the present invention, the external unit is provided so that the housing thereof adjoins the exhaust port of the main body unit, and an opening is formed on the first face adjoining the exhaust port on the housing of the external unit. The air near the exhaust port of the main body unit, namely the air near the opening on the housing of the external unit flows together with the air exhausted from the exhaust port, and negative pressure is generated near the opening of the housing of the external unit. Because of the negative pressure, the air flows from inside of the housing of the external unit toward the opening, and the heating element inside the housing of the external unit can be cooled by the air. As described above, the external unit according to the present invention utilizes negative pressure generated in association with exhaustion of air from the exhaust port of the main body unit, and it is required only to form an opening on the housing of the external unit, so that the size reduction is not impeded.

In this configuration, preferably at least one second opening for sucking air is formed on the housing at a position away from the aforementioned opening.

Negative pressure is generated near the opening formed on the first side face of the housing adjoining the exhaust port in association with exhaustion of air from the exhaust port. When the second opening is formed at a position away from the aforementioned opening, a difference is generated between the air pressure near the second opening and that near the opening formed on the first face adjoining the exhaust port. Because of the difference in the air pressure, air flows from the second opening to the aforementioned opening, and inside of the housing can be cooled with the air securely.

Further, the main body unit preferably has an exhaust fan for forcibly exhausting air inside from the aforementioned opening, and the opening is preferably formed so that, when the main boy unit is placed adjacent thereto, a swirl of air generated in association with the exhaust fan flows away from the aforementioned opening.

In the present invention, when the main body unit has an exhaust fan, negative pressure is generated near the exhaust port (near the opening of the housing of the external unit) in association with rotation of the exhaust fan. Since the negative pressure generated in association with rotation of the exhaust fan is added to that generated in association with exhaustion of air form the exhaust port, larger negative pressure is generated, so that the air inside the housing of the external unit can be exhausted from the opening securely, whereby inside of the housing of the external unit can be cooled.

In addition, as the opening of the external unit is formed at a position where a swirl of air generated in association with rotation of the exhaust fan flows away therefrom, the negative pressure generated in association with rotation of the exhaust fan can be utilized efficiently.

BEST MODE FOR CARRYING OUT THE INVENTION

Embodiments of the present invention are described below with reference to the related drawings.

Figure 1:
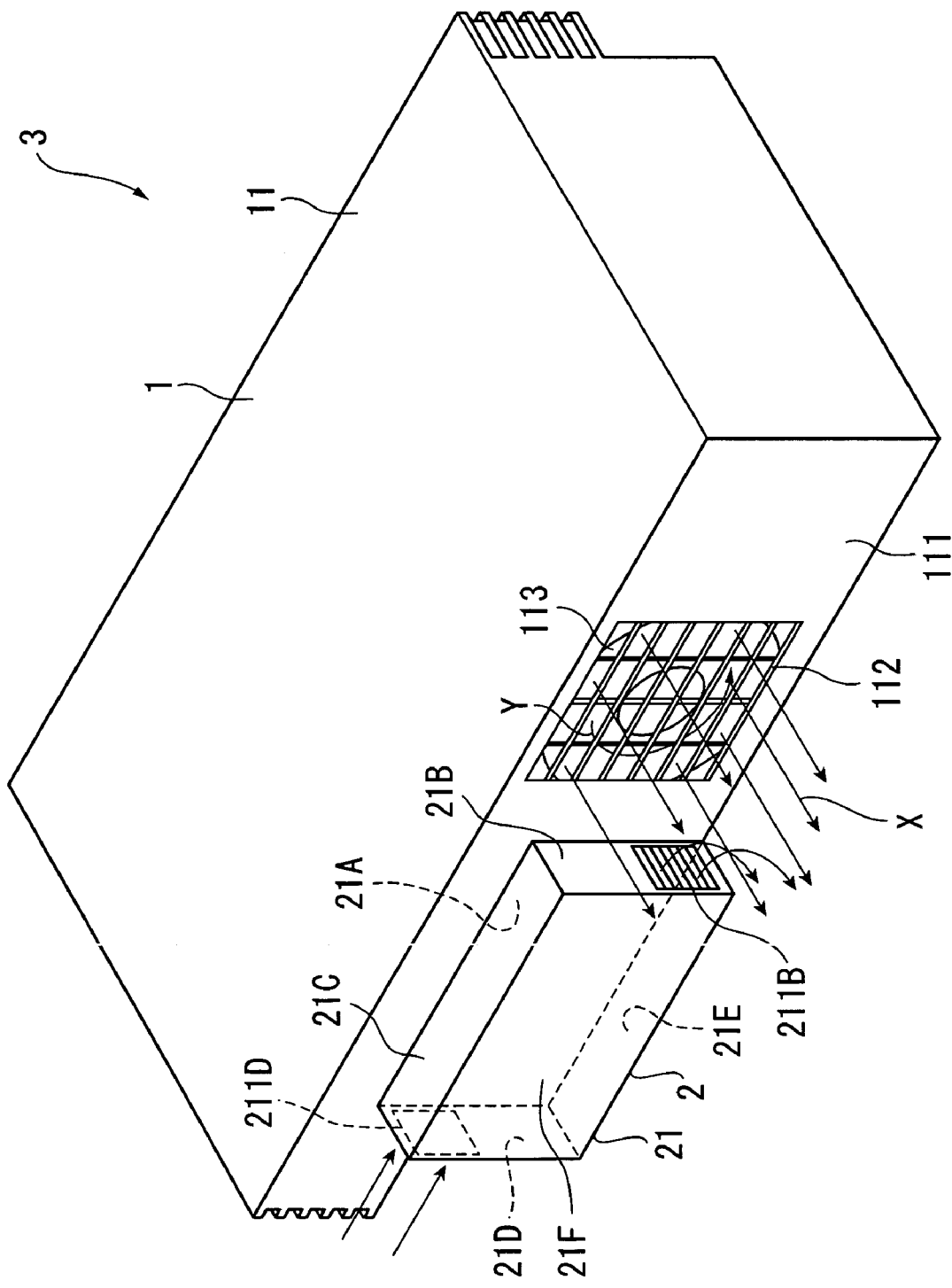
FIG. 1 is a perspective view showing electronic equipment according to an embodiment of the present invention.

FIG. 1 shows an electronic equipment 3 including an electronic equipment main body 1 and an external device (external unit) 2 attached to the electronic equipment main body 1.

The electronic equipment 3 is, for instance, an entertainment device having a function for reading a game program recorded in an optical disk or the like and executing the game according to an instruction from a user thereof, and a function for reproducing an optical disk with images or music pieces recorded therein.

The electronic equipment main body 1 has a main body section of the electronic equipment (not shown) including a disk device, a CPU (Central Processing Unit), a controller slot, a memory slot, a power switch or the like, and a housing 11 for the main body of the electronic equipment for accommodating the main body section of the electronic equipment therein, although not shown in the figure.

The main body section of the electronic equipment has an air inlet fan (not shown) for sucking air from outside of the housing 11, and an exhaust fan 113 for exhausting the air having been used for cooling to outside of the housing 11, and the CPU etc. are cooled with the fans. The description above assumes a case in which the main body section of the electronic equipment has an air inlet fan, but the air inlet fan is not always required.

The housing 11 has a rectangular shape in plan view and a substantially L-shape in front view.

Provided on a rear face section 111 of the housing 11 are image/audio output terminals for outputting various types of signals such as image signals and audio signals recorded in the optical disk to a display device such as a television, communication terminals for communications with external devices, an AC inlet as a power supply terminal for supplying power from an external power source to the electronic equipment main body 1, a main switch for controlling power supply from the external power source, or the like, although these components are not shown in the figure.

At a position corresponding to location of the exhaust fan 113 on the rear face section 111 of the housing 11, an exhaust port 112 having a substantially square form is formed. The exhaust fan 113 rotates in the direction indicated by the arrow Y (counterclockwise) when viewed from the rear face section 111.

The external device 2 is connected to the electronic equipment main body 1 for enhancing functions of the electronic equipment main body 1, and is, for instance, an external storage device such as a HDD (hard disk drive) for enhancing the storage function of the electronic equipment main body 1 in this embodiment. The external device 2 stores data concerning a game being played on the electronic equipment main body 1, and records and stores therein games or the like downloaded from a server or the like in a case where the electronic equipment main body 1 is connected to the Internet. This external device 2 is attached to a position adjacent to the exhaust port 112 of the electronic equipment main body 1 in the left-hand side in the figure.

A position for attachment of the electronic equipment (translator's comment: external device 2) 2 to the electronic equipment main body 1 may be any position on the condition that a first opening 211B described hereinafter adjoins the exhaust port 112 of the electronic equipment main body 1, and preferably, the position where the air exhausted from the exhaust port 112 does not enter from the first opening 211B and the negative pressure is generated near the first opening 211B.

Although not shown herein, the external device 2 is connected to the electronic equipment main body 1 with a cable based on the SCSI (Small Computer System Interface) standard or the like.

The external device 2 includes a main body section of the external device (not shown) for enhancing functions of the electronic equipment main body 1 and a housing 21 having a substantially box-like shape for accommodating the main body section of the external device therein. The main body section of the external device has a magnetic disk for writing data therein, a spindle motor for rotating this magnetic disk, a control board with ICs and circuit elements mounted thereon, or the like. Heat is generated from the elements mounted on the board or the spindle motor of the main body section of the external device, so that the main body section of the external device is a heating element.

The housing 21 is attached in contact with the rear face section 111 of the electronic equipment main body 1, and includes an attachment face 21A attached to the rear face section 111 of the electronic equipment main body 1, first to fourth side faces 21B to 21E surrounding this attachment face 21A, and a rear face 21F provided at a position opposite to the attachment face 21A.

The first side face 21B is orthogonal to the rear face section 111 of the electronic equipment main body 1, and also adjoins the exhaust port 112. Formed on this first side face 21B is a first opening 211B having a substantially rectangular form and a side along the rear face section 111 as a longer side. Because of this configuration, when the external device 2 is attached to the electronic equipment main body 1, the first opening 211B is placed at a position off from the direction (indicated by the arrow X) in which air is exhausted from the exhaust port 112. Also in this embodiment, the opening direction of the first opening 211B and the direction in which the air is exhausted from the exhaust port 112 of the electronic equipment main body 1 are substantially orthogonal to each other.

The first opening 211B is communicated with inside of the housing 21, and is provided at a position where a swirl of air generated in association with rotation of the exhaust fan 113 flows away therefrom, namely near a lower side section of the first side face 21B in this embodiment because the exhaust fan 113 rotates in the direction indicated by the arrow Y (counterclockwise) when viewed from the rear face section 111. Further, the first opening 211B has a form like a slit, and the width (the length of the shorter side orthogonal to the rear face section 111 of the electronic equipment main body 1) is about 10 mm. Further, the length of the longer side of the first opening 211B is preferably 30 mm or more, and the length is about 30 mm in this embodiment.

The third face 21D is a face facing the first side face 21B. Formed near the upper side of this third side face 21D is a second opening 211D having the same form as the first opening.

The width of the second opening 211D (the length of the shorter side orthogonal to the rear face section 111 of the electronic equipment main body 1) is about 10 mm. Further also the length of the longer side of the second opening 211D is preferably 30 mm or more, and the length is about 30 mm in this embodiment.

The second opening 211D and the first opening 211B are positioned to be substantially symmetric about the center of the external device 2 when viewed from the attachment direction of the external device 2 to the electronic equipment main body 1.

A cooling system for the aforementioned external device 2 has the configuration as described below.

When the exhaust fan 113 of the electronic equipment main body 1 is driven, air inside the housing 11 of the electronic equipment main body 1 is exhausted from the exhaust port 112. As the exhaust fan 113 rotates counterclockwise when viewed from the rear face section 111 of the housing 11, the air is exhausted with a counterclockwise flow in the direction indicated by the arrow X.

In this step, the air near the exhaust port 112, namely air near the first opening 211B on the first side face 21B adjoining the exhaust port 112 flows in the direction indicated by the arrow X together with the air exhausted from the exhaust port 112, and a negative pressure is generated near the first opening 211B.

In addition, as the fan 113 is provided in the inner side of the exhaust port 112, negative pressure is generated near the first opening 211B also in association with rotation of this exhaust fan 113 in the direction indicated by the arrow Y.

As the second opening 211D of the external device 2 is formed on the third side face 21D not facing the exhaust port 112, a difference is generated between the air pressure near the first opening 211B and that near the second opening 21D. Because of this difference in air pressure, the second opening 211D functions as an air inlet port and the first opening 211B functions as an exhaust port, so that air flows into inside of the housing 21 for the external device 2. Inside of the housing 21 for the external device 2 is cooled by the air.

With the embodiment described above, the following effects are provided.

(1) The air near the first opening 211B formed on the first side face 21B facing the exhaust port 112 of the electronic equipment main body 1 flows together with the air exhausted from the exhaust port 112, and negative pressure is generated near the first opening 211B, so that a difference is generated between the air pressure near the second opening 211D and that near the first opening 211B, and therefore the air flows from the second opening 211D toward the first opening 211B. Thus, inside of the housing 21 for the external device 2 can be cooled by this air flow.

(2) In addition, negative pressure is generated near the first opening 211B also in association with rotation of the exhaust fan 113, so that a great difference is generated between the air pressure near the second opening 211D and that near the first opening 211B, and therefore inside of the housing 21 for the external device 2 can be cooled securely.

(3) The negative pressure generated in association with exhaustion of air from the exhaust port 112 and the negative pressure generated in association with rotation of the exhaust fan 113 are utilized, and inside of the housing 21 can be cooled only by forming the first opening 211B and the second opening 211D on the housing 21 of the external device 2, and therefore, size reduction of the external device 2 is not impeded even when the configuration for cooling the external device 2 is employed. Because of this feature, size reduction of the external device 2 is possible, and further also size reduction of the electronic equipment 3 having the external device 2 is possible.

(4) Further, since it is required only to form the openings 211B, 21 ID, so that manufacturing cost of the external device 2 can be reduced as compared to a case where a fan or a heat sink for cooling is provided.

(5) Inside of the housing 21 for the external device 2 is cooled by utilizing the negative pressure generated in association with exhaustion of air from the exhaust port 112 of the electronic equipment main body 1 and the negative pressure generated in association with rotation of the exhaust fan 113, additional energy for cooling is not required, and energy consumption can be reduced as compared to a case where, for instance, a fan for cooling is provided anew.

(6) Further, as the second opening 211D is formed on the housing 21, a sufficient quantity of fresh air can be introduced, so that inside of the housing 21 for the external device 2 can be cooled securely.

(7) Further, the second opening 211D is provided at a position away from the first opening 211B, namely on the third side face 21D which is a different face from the first side face 21B with the first opening 211B formed thereon, so that air can be passed through inside of the housing 21. Especially, the third side face 21D faces the first side face 21B, so that air can be sent to all portions inside the housing 21 by forming the second opening 211D on the face, and therefore inside of the housing 21 can be cooled more securely.

(8) Further, as the first opening 211B and the second opening 211D are positioned to be substantially symmetric about the center of the external device 2, the air passes through the center of the external device 2, so that cooling can be carried out efficiently. Further, a flow path for the air can be made relatively longer by forming the openings 211B, 211D at the positions as described above, and therefore, inside of the housing 21 can be cooled sufficiently.

(9) The first opening 211B is formed at a position where a swirl of air generated in association with rotation of the exhaust fan 113 flows away therefrom, so that negative pressure generated in association with rotation of the exhaust fan 113 can be utilized efficiently, and therefore inside of the external device 2 can be cooled securely.

(10) Further, since the widths of the first opening 211B and the second opening 211D are set to 10 mm or more, the external device 2 can be cooled efficiently.

It is to be noted that the present invention is not limited to the embodiments described above, and modifications, improvements, and other changes in a range in which the objects of the present invention are achievable is within a scope of the present invention.

Figure 2A:
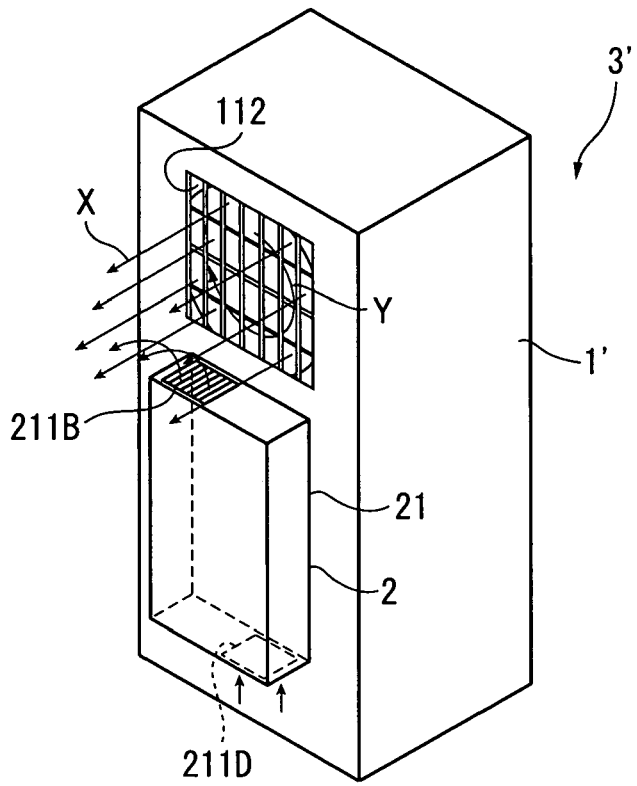
FIG. 2 is a perspective view showing a variant of the embodiment.
Figure 2B:
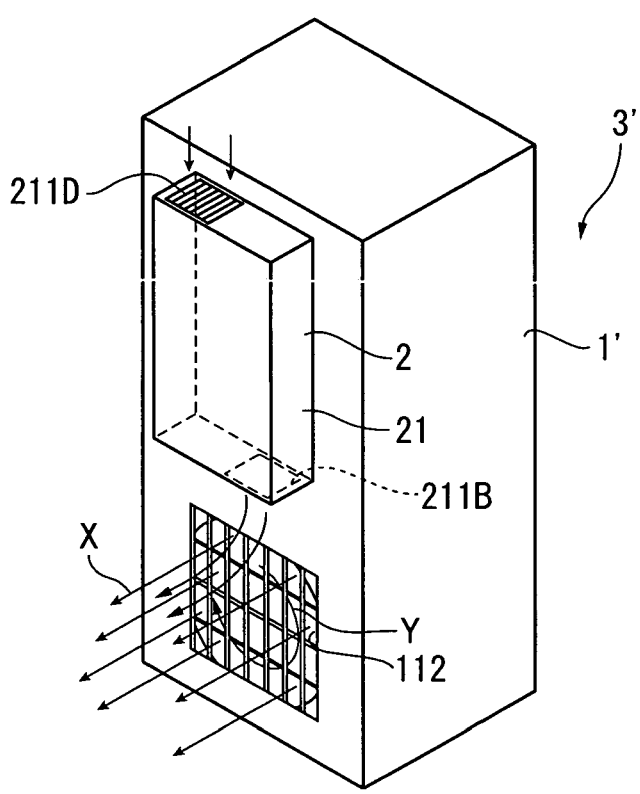
Figure 3:
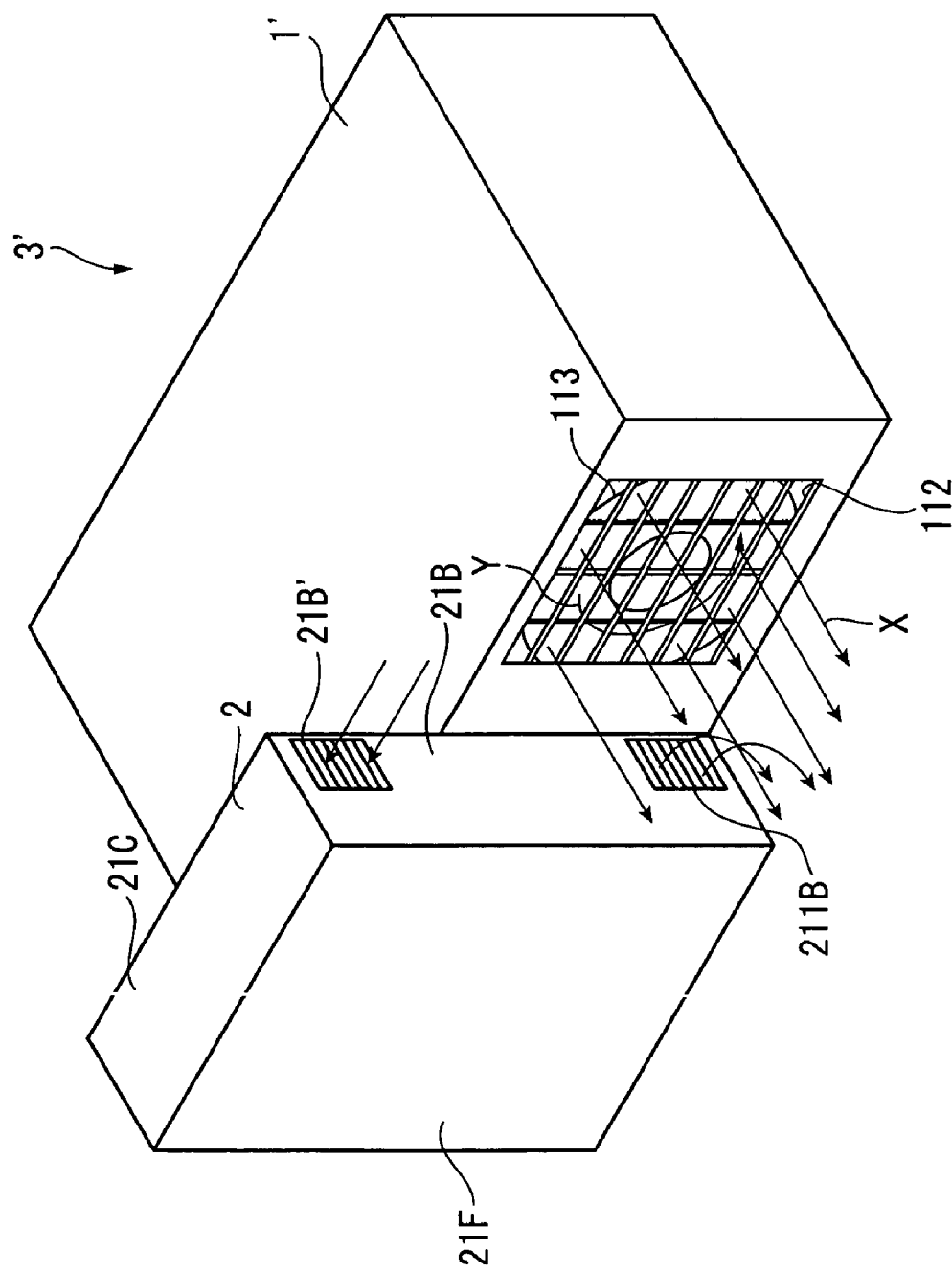
FIG. 3 is a perspective view showing another variant of the embodiment.

For instance, in the embodiments described above, it is assumed that the electronic equipment 3 is an entertainment device, but the present invention is not limited to this configuration, and the electronic equipment 3 may be a personal computer 3', or other types of electronic equipments such as a copying machine, a scanner, a facsimile device or the like as shown in FIG. 2A, FIG. 2B, and FIG. 3. When the electronic equipment is, for instance, a personal computer 3', it may include a personal computer main body 1' equipped with a CPU therein (main body unit) and the external device 2 attached to the personal computer main body 1'.

When the electronic equipment is a printer, it may include a printer main body as an electronic equipment main body for printing (main body unit) and an external storage device as an external device attached thereto (external unit). The external storage device is used for accumulating image data transmitted thereto for printing, and the printer main body reads out the image data for printing from this external storage device and executes printing.

Any unit may be used as the main body unit on the condition that air is exhausted from an exhaust port provided therein, and any of, for instance, an outdoor unit for an air conditioner, an electric fan, a cleaner, an internal combustion engine, an external combustion engine or the like may be included as the main body unit in the configuration.

In the descriptions of the embodiments above, it is assumed that the external device 2 is a storage device, but the present invention is not limited to this configuration, and for instance, a V-RAM (Video Random Access Memory) for enhancing an image processing function may be included as the external device 2 in this configuration on the condition that at least a heating element is included therein.

In the descriptions of the embodiments above, it is assumed that the external unit is an external device for enhancing functions of the electronic equipment main body (main body unit), but the present invention is not limited to this configuration, and the external unit does not have to be the one for enhancing functions of the main body unit, and further the configuration is allowable in which there is no functional connection between the main body unit and the external unit.

In the description of the embodiments above, it is assumed that the external device 2 is provided at a position adjacent to the exhaust port 112 in the left-hand side in FIG. 1, but the external device may be provided at any position on the condition that a side face of the housing with an opening provided thereon adjoins the exhaust port of the electronic equipment main body, and for instance, when there is a space available for attachment of the external device 2 under the exhaust port 112 as shown in FIG. 2A, the external device may be provided adjacent to and under the exhaust port 112. Further, in a case where there is a space available for attachment of the external device 2 above the exhaust port 112 as shown in FIG. 2B, the external device 2 may be provided adjacent to and above the exhaust port 112.

Further, in the descriptions of the embodiments above, it is assumed that the widths of the first opening 211B and the second opening 211D are about 10 mm, but the present invention is not limited to this configuration, and the widths may be more than 10 mm, or may be less than 10 mm. It is to be noted that the optimal size and optimal location of each opening may be decided according to the size of the external device 2, density inside the external device 2, a calorific value, an air volume displacement of the exhaust fan 113, and other related parameters.

In the descriptions of the embodiments above, forms of the openings 211B, 211D are rectangular, but the form is not limited to this one, and any form such as, for instance, a circular one is allowable on the condition that suction and exhaustion of air is possible therethrough.

Further, the first opening 211B may be provided at a position where a swirl of air generated in association with rotation of the exhaust fan 113 flows toward the opening. In this case, a wind guide plate may be provided in the exhaust port 112 to direct the air exhausted from the exhaust port 112 of the electronic equipment main body 1 away from the first opening, or a wind guide plate for intercepting the air exhausted from the exhaust port 112 of the electronic equipment main body 1 may be provided in the first opening of the external device.

In the descriptions of the embodiments above, it is assumed that electronic equipment main body 1 has the exhaust fan 113, but any configuration is allowable on the condition that at least air is exhausted from the exhaust port, and for instance, when the main body unit is an internal combustion engine or an external combustion engine, an exhaust fan is not required.

In the descriptions of the embodiments above, it is assumed that the first opening 211B and the second opening 211D are positioned to be substantially symmetric about the center of the external device 2, but the two openings are not always required to be provided at substantially symmetrical positions.

In the descriptions of the embodiments above, it is assumed that the second opening 211D is formed on the third side face 21D facing the first side face 21B with the first opening 211B formed thereon, but the present invention is not limited to this configuration, and for instance, the second opening may be formed on the second side face 21C, and further as shown in FIG. 3, a second opening 21B' may be formed on the first side face 21B in a case where there is a portion not affected by the air exhausted from the exhaust port 112 on the first side face 21B.

Figure 4:
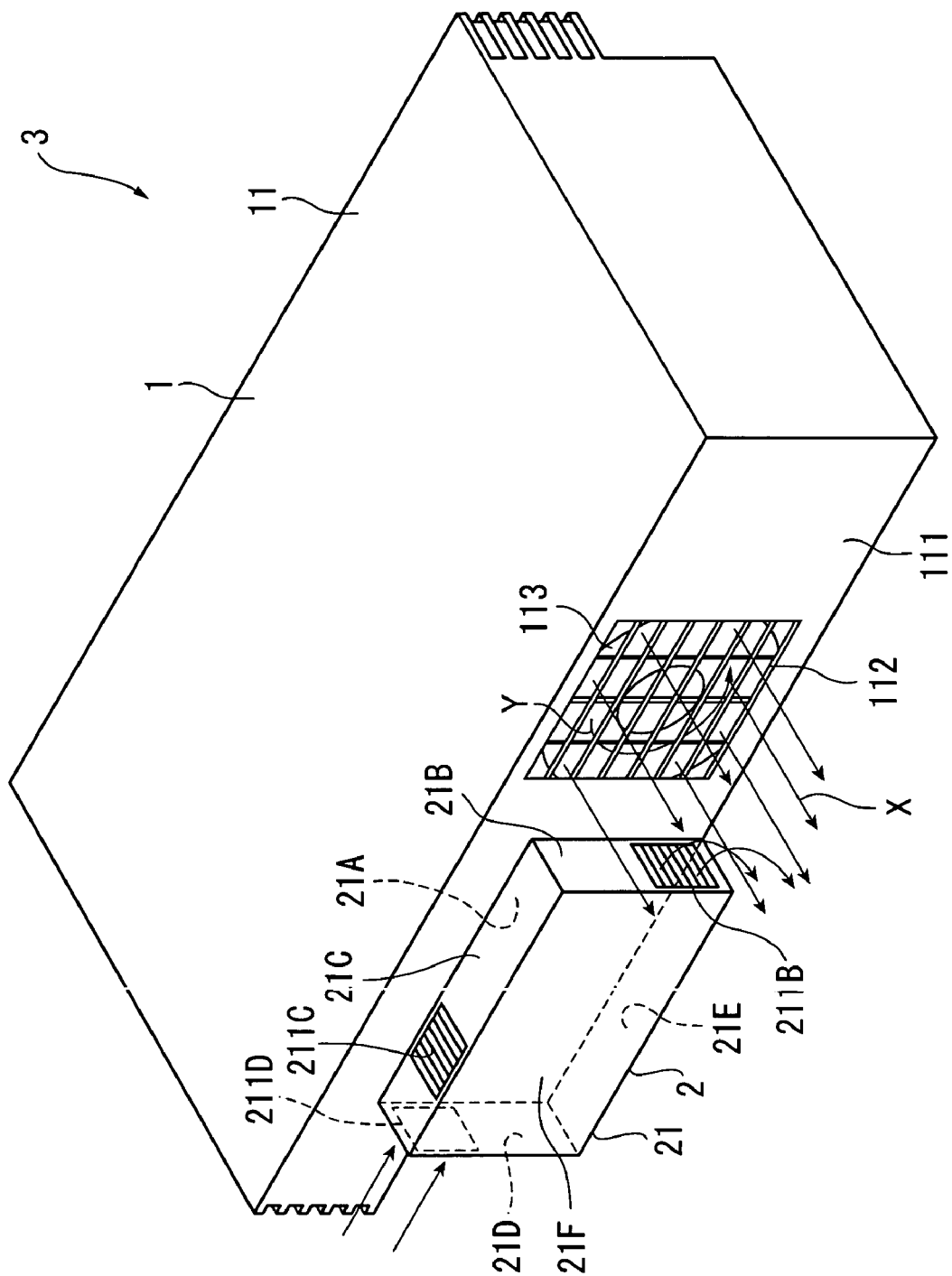
FIG. 4 is a perspective view showing still another variant of the embodiment.

In the descriptions of the embodiments described above, it is assumed that only one second opening 211D is formed, but a number of second openings 211D is not limited to one, and two or more second openings 211D may be provided. For instance, as shown in FIG. 4, in addition to the second opening 211D, an additional second opening 211C may be formed on the second side face 21C. In this case, air comes into inside of the housing 21 not only from the second opening 211D, but also from the additional second opening 211C, and is exhausted from the first opening 211B, so that the external device 2 can be cooled more efficiently.

Also the configuration is allowable in which the second opening 211D is not formed, and air flows into inside of the housing from and through a clearance formed on the housing of the external device. In this case, it is not necessary to form the second opening, so that manufacture of the external device can be simplified.

Like the case of second opening 211D, a number of first openings 211B is not limited to one, and two or more openings may be provided.

EXAMPLES

The experiment as described below was carried out to confirm effects of the present invention.

(Method of Experiment)

An external device 2 equipped with a heater therein was attached at a position adjacent to an exhaust port 112 of an electronic equipment main body 1 like in the embodiments described above. Temperature was measured while changing the widths of a first opening 211B and a second opening 211D on the housing 21 for the external device 2.

Measurement was performed for air temperature on a rear face 21F of a housing 21 for the external device 2, near an IC provided on a board in the housing 21 for the external device 2, and near the first opening 211B and second opening 211D.

The measurement positions on the rear face 21F are near the center of the plane, near the first opening 211B, and near the second opening 211D.

Comparative Example

Measurement of temperature was performed in a case where the first and second openings are not provided for comparison to the Example described above. The measurement position was at same as those employed in the Example.

Results in Example and Comparative Example

Figure 5:
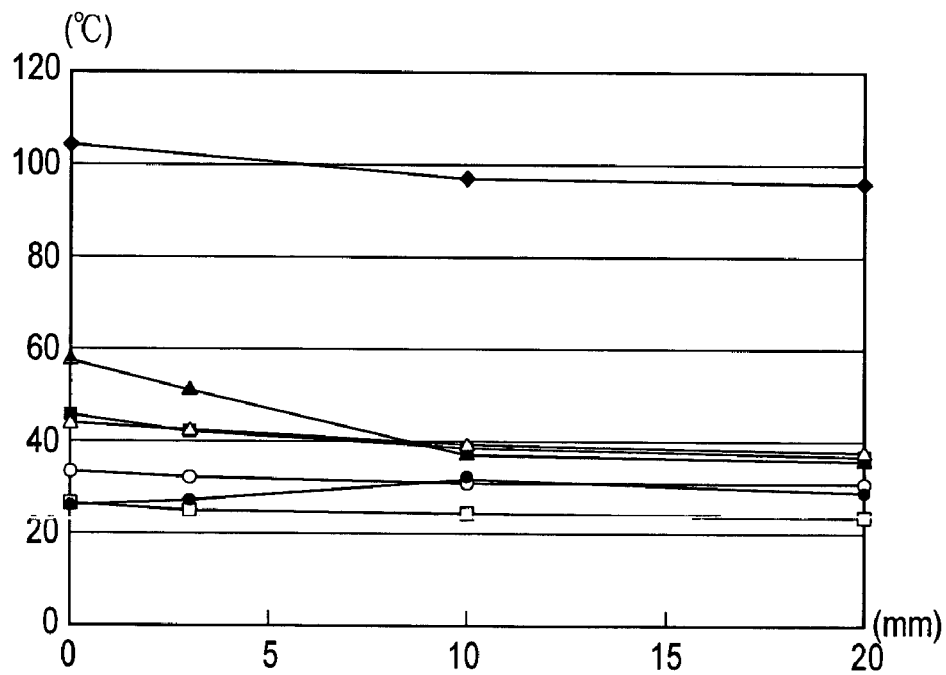
FIG. 5 is a view showing a result of an example of the present invention.
Figure 6:
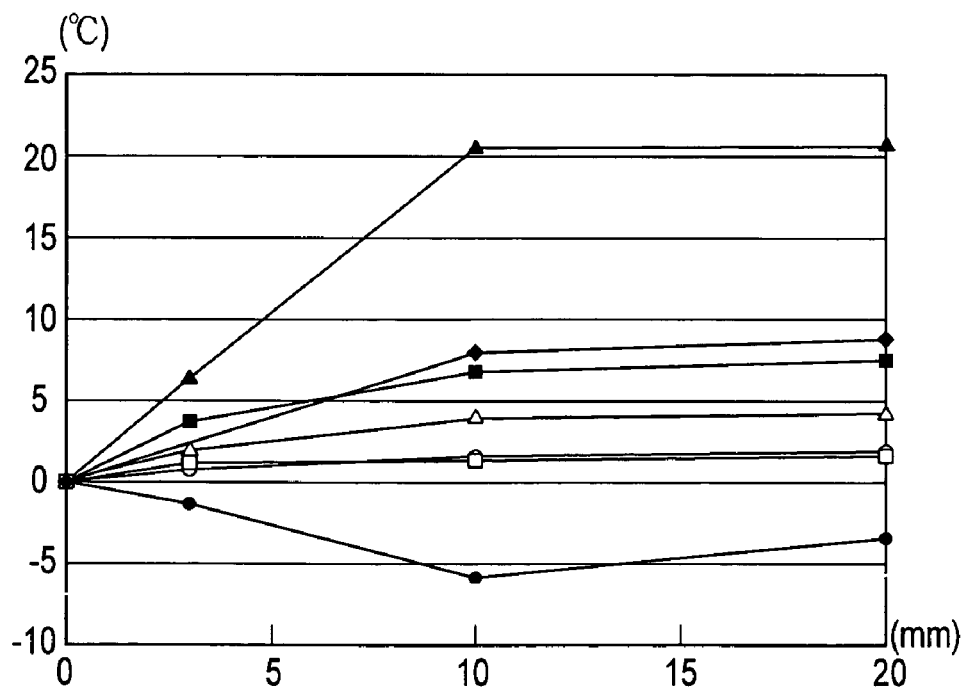
FIG. 6 is a view showing a result of another example of the present invention.

The results are shown in FIG. 5 and FIG. 6 respectively. In FIG. 5 and FIG. 6, 0 mm as the width of the opening indicates a case where the first opening 211B and the second opening 211D are not formed (Comparative Example). Further, in FIG. 2 and FIG. 3, the housing (left) shows a portion near the second opening 211D on the rear face 21F, the housing (middle) shows a portion near the center of the plane of the rear face 21F, and the housing (right) shows a portion near the first opening 211B on the rear face 21F.

It was confirmed that the temperatures neat the heater, IC, housing 21, and second opening 211D were lowered by forming the openings 211B, 211D on the housing 21 of the external device.

On the rear face 21F of the housing 21, the temperature lowered most near the second opening 211D, and the temperature drop became smaller at the position closer to the first opening 211B.

Further, the temperature of the air near the first opening 211B was higher as compared to a case where the first opening 211B was not formed. This fact indicates that the air sucked from the second opening 211D cooled inside of the housing 21 and was then exhausted.

When the widths of the first opening 211B and the second opening 211D were 10 mm or more, the very high cooling effect with a temperature drop of 20° C. or more could be achieved in a portion near the IC.

INDUSTRIAL AVAILABILITY

As described above, the cooling system according to the present invention can be applied to electronic equipment such as an entertainment device, or a personal computer. Also the external unit according to the present invention is effective to devices placed adjacent to the main body unit, especially, for instance, an external device for enhancing functions of an electronic equipment main body, and is also especially suited to use in devices requiring cooling and size reduction.

The invention claimed is:

1. A cooling system for cooling an external unit provided at a position adjacent to a main body unit having an exhaust port for exhausting air inside thereof,
    wherein said external unit comprises a heating element and a housing for accommodating the heating element therein,
    wherein at least one opening communicating with inside of the housing is provided on a first face adjoining said exhaust port on the housing of the external unit,
    wherein at least a second opening for sucking air is formed on the housing of said external unit at a position away from said opening,
    wherein said housing has a second face facing the first face with said opening formed thereon, and said second opening is formed on the second face, and
    wherein said opening and said second opening are positioned to be substantially symmetric about the center of said external unit.

2. The cooling system according to claim 1, wherein said main body unit has an exhaust fan for forcibly exhausting air inside the main body unit from said exhaust port.

3. The cooling system according to claim 2, wherein said opening is provided at a position where a swirl of air generated in association with rotation of said exhaust fan flows away from said opening.

4. The cooling system according to claim 1, wherein said external unit is attached to said main body unit.

5. The cooling system according to claim 1, wherein the width of said opening is at least 10 mm or more.

6. The cooling system according to claim 1,
    wherein said main body unit is an electronic equipment main body, and
    wherein said external unit is an external device connected to said electronic equipment main body for enhancing functions of the electronic equipment main body.

7. An electronic equipment comprising an electronic equipment main body and an external device connected to the electronic equipment main body for enhancing functions of the electronic equipment main body,
    wherein said electronic equipment main body has an exhaust port for exhausting air inside the electronic equipment main body,
    wherein said external device has a main body section for functional enhancement and a housing for accommodating the main body section therein,
    wherein said main body comprises a heating element,
    wherein said external device is attached to said electronic equipment main body so that it adjoins said exhaust port,
    wherein at least an opening communicating with inside of said housing is formed on a face of the external device adjoining said exhaust port,
    wherein at least a second opening for sucking air is formed on the housing of said external device at a position away from said opening,
    wherein said housing has a second face facing the first face with said opening formed thereon, and said second opening is formed on the second face, and
    wherein said opening and said second opening are positioned to be substantially symmetric about the center of said external device.

8. The electronic equipment according to claim 7,
    wherein said electronic equipment main body has an exhaust fan for forcibly exhausting the air cooling inside thereof from said exhaust port, and
    wherein said opening is provided at a position where a swirl of air generated in association with rotation of said exhaust fan flows away from said opening.

9. An external unit provided at a position adjacent to a main body unit having an exhaust port for exhausting air inside thereof,
    wherein said external unit comprises a heating element and a housing for accommodating the heating element therein,
    wherein at least an opening commununicating with inside of the housing is formed on a face of the housing adjoining said exhaust port, wherein at least a second opening for sucking air is formed on the housing of said external unit at a position away from said opening, wherein said housing has a second face facing the first face with said opening formed thereon, and said second opening is formed on the second face, and wherein said opening and said second opening are positioned to be substantially symmetric about the center of said external unit.

10. The external unit according to claim 9, wherein said main body unit has an exhaust fan for forcibly exhausting air inside from said opening, and wherein said opening is formed at a position where, when placed at a position adjacent to said main body unit, a swirl of air generated in association with rotation of said exhaust fan flows away from said opening.

11. The electronic equipment according to claim 7, wherein said external unit is attached to said main body unit.

12. The electronic equipment according to claim 7, wherein the width of said opening is at least 10 mm or more.

13. The electronic equipment according to claim 7, wherein said main body unit is an electronic equipment main body, and wherein said external unit is an external device connected to said electronic equipment main body for enhancing functions of the electronic equipment main body.

14. The external unit according to claim 9, wherein said external unit is attached to said main body unit.

15. The external unit according to claim 9, wherein the width of said opening is at least 10 mm or more.

16. The external unit according to claim 9, wherein said main body unit is an electronic equipment main body, and wherein said external unit is an external device connected to said electronic equipment main body for enhancing functions of the electronic equipment main body.

* * * * *